UNITED STATES PATENT OFFICE.

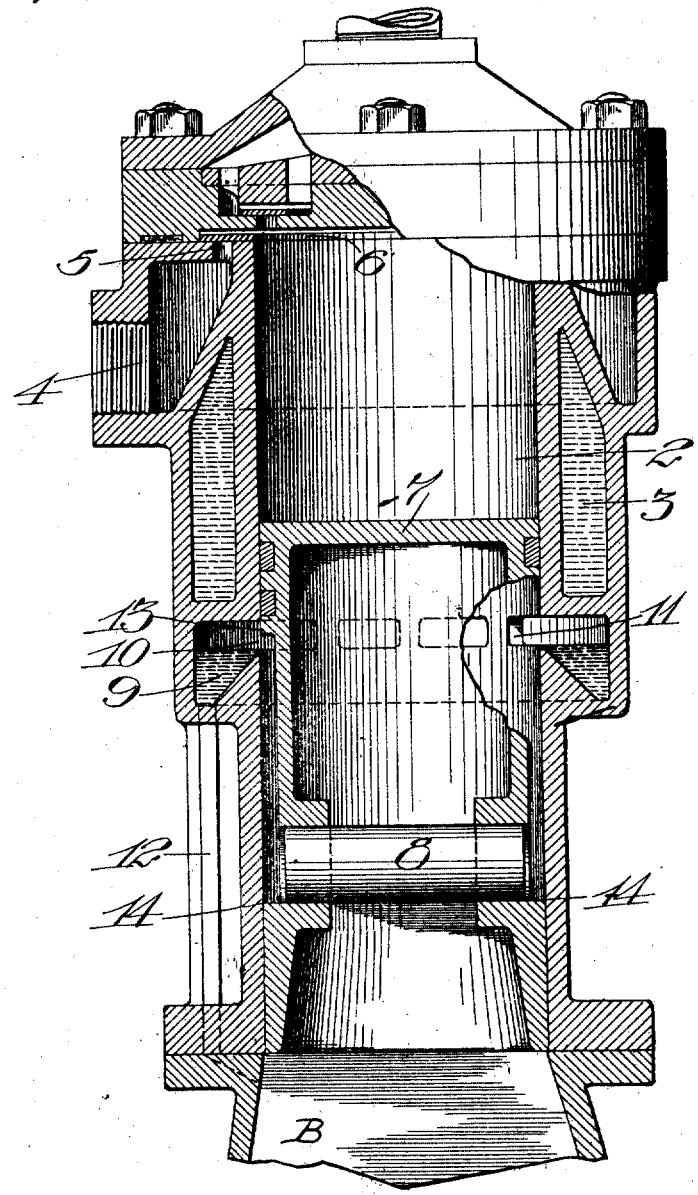

EDWARD A. RIX, OF PIEDMONT, CALIFORNIA.

LUBRICATING SYSTEM.

1,001,306.

Specification of Letters Patent. Patented Aug. 22, 1911.

Application filed March 20, 1911. Serial No. 615,462.

*To all whom it may concern:*

Be it known that I, EDWARD A. RIX, a citizen of the United States, residing at Piedmont, in the county of Alameda and State of California, have invented new and useful Improvements in Lubricating Systems, of which the following is a specification.

This invention pertains to a new and improved method of lubricating air compressors, and particularly that type known as splash oiling and single-acting. In such compressors the crank case is made oil-tight, and the crank end of the connecting rod is made to strike or splash into a body of oil resting at a proper height in the bottom of the crank case. The splash so produced distributes the oil over the shaft bearings, the crank pin bearings, against the cylinder walls, and even upon the piston pin, and makes an ideal system, as far as lubricating is concerned. The oil, however, which falls against the cylinder walls is carried by the reciprocation of the piston into the cylinder itself in excessive quantities, and is discharged from the cylinder with the air. In a compressor operating at 400 R. P. M. having 4½" diameter of cylinder by 4½" stroke with the connecting rod dipping about ⅛ of an inch into the oil, as many as 40 drops per minute, or 24,000 drops in a ten-hour run, will be delivered into the cylinder and discharged from there with the air. It is at once apparent that this is expensive and undesirable. In many of the applications of compressed air, damage results from the oil which the air contains, and while it is possible to abstract this oil by special apparatus, and by chemical treatment, the expense and trouble to maintain such apparatus render such methods very undesirable, with the result that other kinds of compressors are selected for such particular applications of the compressed air. If the dipping of the connecting rod, or any small projection thereof, is limited so that a small splash is produced, which will not reach the cylinder walls, then the piston pin will fail to receive lubrication, and the same result is produced if the number of revolutions of the crank is lessened. Splash lubrication is thus in many instances prohibitive, while it is very desirable because of its simplicity and the elimination of oil cups.

Therefore, it is the object of my present invention to provide a method for the lubrication of air compressors and other machinery which will absolutely control the amount of oil which the piston delivers to the cylinder, and which will permit an unlimited freedom of splash, and one which can at the same time be converted into a lubricator feed, if desired.

The invention consists of the parts and the combination and construction of parts as hereinafter more fully described and claimed, having reference to the accompanying drawings, in which the figure is a section through a vertical compressor cylinder illustrating my lubricating system.

In the present embodiment of my invention, 2 represents a cylinder surrounded by a water jacket, as 3, and which cylinder has an air intake passage 4, and through which the air entering passes through ports 5, covered by an intake valve 6, and into the cylinder. Within the cylinder 2 is a trunk piston 7, reciprocating within the cylinder and carrying a piston pin 8, to which a connecting rod may be attached. The piston is in contact with the cylinder at each end only for a sufficient width to carry the rings and give a proper bearing surface for the piston within the cylinder walls. The distance between these two bearing surfaces should be not less than the stroke of the piston for the minimum amount of oil delivered to the air which is being compressed, and by diminishing this distance the delivery of oil will be increased, as will be later explained.

The piston 7 is slightly reduced between the end bearing portions to form a shallow chamber or waist portion, which is substantially equal in length to the length of the stroke of the piston, and at a point on the cylinder sufficiently distant from the head to allow a proper bearing for the upper bearing surface of the piston is an annular oil pocket 9, surrounding the cylinder and having an annular opening 10 into the cylinder chamber. For the purpose of giving a minimum delivery of oil into the compressed air, this annular opening or mouth 10 must be continuous, but a number of bridges or webs, as 11, may be provided if more than a minimum delivery of oil is desired.

During the operation of the piston its surface becomes partly covered with a quantity of oil, and as it rises in the cylinder the lower bearing portion of the piston carries a part of the oil upwardly, and when a circumferential shoulder or line 14 of the piston passes the acute lip formed by the wall of the cylinder at the mouth 10 of the pocket 9, and then starts downwardly again, the excess oil which was carried on the bearing portion of the piston is wiped therefrom and discharged into the pocket 9, which may be connected by a passage or conducting pipe 12, so that as the oil accumulates in the pocket 9 this accumulation is drained off and returned to the crank case, as indicated at B, below the cylinder.

The annular opening or mouth 10 in the cylinder is spaced for a minimum oil delivery, so that at the end of the suction stroke the shoulder or line 13 at the upper portion of the piston stops at approximately the center of the annular opening or mouth, and at the end of the compression stroke the shoulder or lines 14 stops in approximately the same transverse plane.

It is evident from this construction that any oil which may be carried upward by the lower bearing part or portion of the piston will be delivered into the oil pocket and returned to the crank case by the drain pipe 12, and it will be impossible for any oil to be delivered by the lower part of the piston to the upper internal walls of the cylinder.

In actual operation it is found that the heat of compression volatilizes a small portion of the oil and it condenses on the upper inner surface of the cylinder sufficiently to thoroughly lubricate it. If more oil is needed, it is only necessary to either cast bridges or webs 11 in sufficient number in the annular mouth or wall 10, or to place the shoulder or line 13 farther away from the upper transverse end of the piston 7, or to increase the distance between the lower end of the piston 7 and the shoulder or line 14, so that either the upper part of the piston runs into the oiled cylinder surface below the annular opening, or the oiled piston runs into the upper cylinder surface.

Having thus described my invention, what I claim and desire to secure by Letters-Patent, is—

1. In a splash system of lubrication, the combination of a cylinder, a piston and the crank case adapted to contain oil, the cylinder having an oil pocket to one side of the piston and opening into the cylinder so that the mouth of the pocket is traversable by the piston, the piston having a turned-down waist portion and the mouth of the pocket so arranged with relation to the turned-down portion of the piston that the mouth of the pocket is never completely covered by the piston, thereby preventing the oil being carried up by the piston into the cylinder space above the piston.

2. A system for the lubrication of a machine, having a stationary bearing part and a moving part, said moving part being provided with bearing surfaces whereby oil is carried from a source of supply in one portion of the machine and deposited in a receiving chamber formed in the stationary part, and returning part of said oil so deposited to the source of supply.

3. A means for lubricating air compressors, comprising a cylinder provided with an oil receiving pocket, an annular lip formed on the internal wall of the cylinder, and a piston movable within the cylinder and adapted to transfer oil deposited upon the lower walls of the cylinder above the annular lip, by which lip a portion of the oil carried on the surface of the piston is removed therefrom and deposited in the oil receiving pocket.

4. In a splash system of lubrication, the combination of a cylinder, a piston and crank case adapted to contain oil, said cylinder having an annular pocket formed in its walls with the mouth of the pocket traversable by the piston, said pocket having an oil return duct back into the crank case.

5. In a splash oiling system, the combination with a cylinder, a piston and the crank case, of means for removing oil carried by the piston in excess of that necessary for lubrication and before it reaches the space in the cylinder on the opposite side of the piston from the crank case.

In testimony whereof I have hereunto set my hand in the presence of two subscribing witnesses.

EDWARD A. RIX.

Witnesses:
G. M. PAGE,
A. W. WOOD.